United States Patent [19]

Koch

[11] 4,006,914
[45] Feb. 8, 1977

[54] LAWNMOWER HANDLE FOR MOWING TERRACES

[76] Inventor: Edward G. Koch, 716 Benton Blvd., Kansas City, Mo. 64124

[22] Filed: Oct. 15, 1975

[21] Appl. No.: 622,771

[52] U.S. Cl. ................ 280/47.37 R; 16/111 A
[51] Int. Cl.² .......................................... B62B 5/06
[58] Field of Search ............ 280/47.37; 16/111 A; 56/DIG. 18

[56] References Cited
UNITED STATES PATENTS

| | | | |
|---|---|---|---|
| 2,675,661 | 4/1954 | Titzer | 280/47.37 R |
| 3,116,937 | 1/1964 | Price | 280/47.37 R |
| 3,246,909 | 4/1966 | Siwek | 280/47.37 R |
| 3,743,313 | 7/1973 | Koch | 280/47.37 R |

*Primary Examiner*—Robert R. Song
*Attorney, Agent, or Firm*—Fishburn, Gold & Litman

[57] ABSTRACT

A lawnmower handle, particularly adapted for use when mowing steep slopes, terraces, and the like, has spaced end portions of a lower handle member mounted on a lawnmower housing and extending generally parallel with the direction of travel of the lawnmower and rearwardly from the housing for supporting thereon an upper handle member extending upwardly and rearwardly therefrom. An auxiliary handle member has spaced end portions pivotally mounted on the lower handle member and has a gripping portion positioned rearwardly of and substantially level with a gripping portion of the first named upper handled member. The mower handle is releasably retained in a first position for use during mowing substantially level surfaces and gentle slopes and releasably retained in a second position for use during mowing up or down a steep slope or terrace.

3 Claims, 6 Drawing Figures

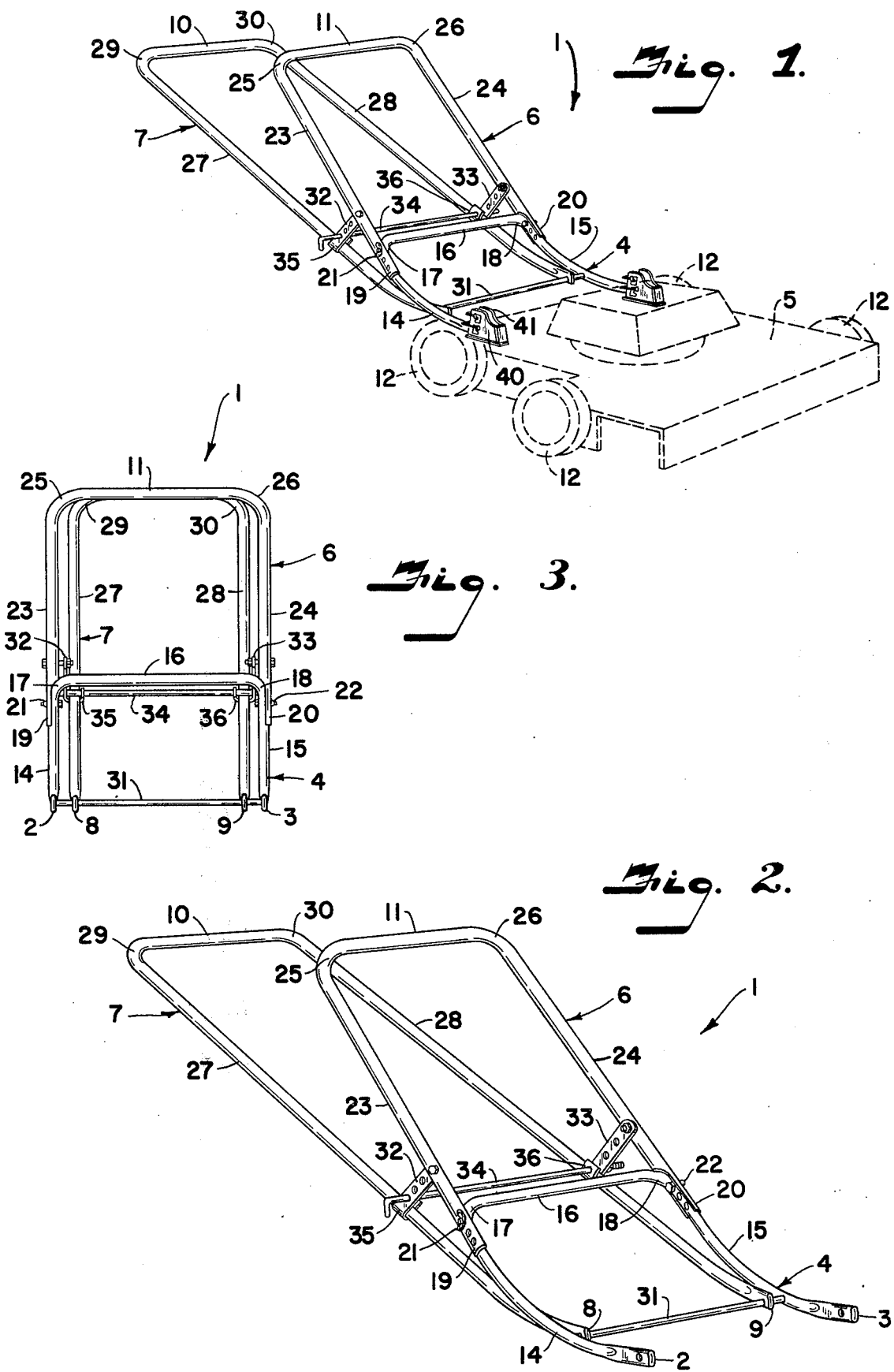

LAWNMOWER HANDLE FOR MOWING TERRACES

The present invention relates to lawnmowers and handles therefor and more particularly to a lawnmower handle having a lower handle member with spaced end portions adjustably mounted on a housing of a lawnmower and extending substantially parallel with a direction of travel of the lawnmower.

The present invention includes improvements of the lawnmower and handle therefor disclosed in U.S. Pat. No. 3,743,313 issued July 3, 1973 to Edward G. Koch. The improvements include positioning arms of a lower handle member substantially parallel with an upper surface of a lawnmower housing for more direct application of pushing and pulling forces to the lawnmower housing, positioning a gripping portion of an auxiliary handle member rearwardly of and substantially level with a gripping portion of an upper handle member to permit easier mowing of steep slopes and terraces, and providing handle mounting means adapted to permit moving the lawnmower handle between a first position for use during mowing substantially level surfaces and gentle slopes and a second position for use during mowing steep slopes, terraces, and the like.

The principal objects of the present invention are: to provide an improved lawnmower and handle therefor particularly adapted for use when mowing steep slopes, terraces, and the like; to provide such a lawnmower handle movable between a first position for use when mowing substantially level surfaces and gentle slopes and a second position for use during mowing a steep slope or terrace; to provide such a lawnmower handle having a lower handle member with spaced end portions thereof mounted on the lawnmower with arms extending rearwardly from the lawnmower housing whereby the arms are substantially parallel with the direction of travel of the lawnmower; to provide such a lawnmower handle having an auxiliary handle member having a gripping portion spaced rearwardly from and substantially level with a gripping portion of an upper handle member mounted on the lower handle member; to provide such a lawnmower handle wherein the lower handle member has arms extending from spaced end portions thereof and positioned to form an angle in the range of zero degrees to thirty degrees (0° to 30°) between the arms and a plane extending from the lower handle member end portions and substantially parallel with a surface supporting the lawnmower; to provide such a lawnmower handle having gripping portions positioned for ease in applying pushing and pulling forces to the lawnmower; to provide such a lawnmower handle adapted to be dissassembled into a lower handle member, an upper handle member, and an auxiliary handle member for ease in storage and shipping; and to provide such a lawnmower and handle therefor which is economical to manufacture, durable in construction, easy to assemble, easy to fold for storage, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment illustrating various objects and features of the lawnmower and handle therefor of the present invention.

FIG. 1 is a perspective view of a lawnmower and handle therefor embodying features of the present invention.

FIG. 2 is an enlarged perspective view of the lawnmower handle.

FIG. 3 is an enlarged front elevational view of the lawnmower handle.

Figure 4:
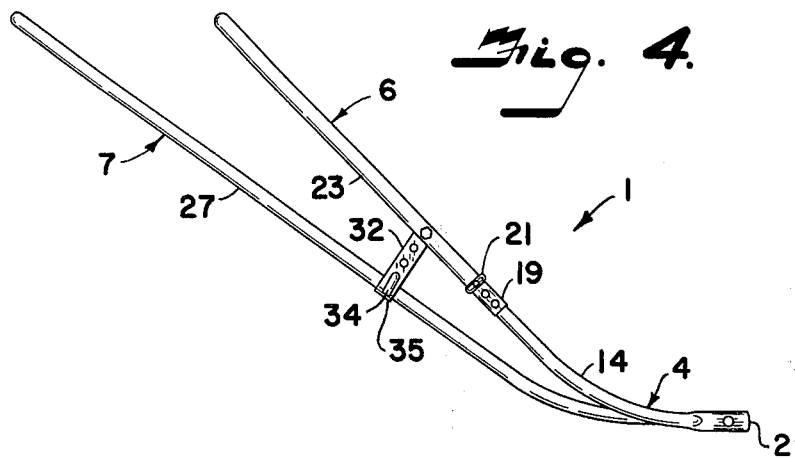
FIG. 4 is an enlarged side elevational view of the lawnmower handle.
Figure 6:
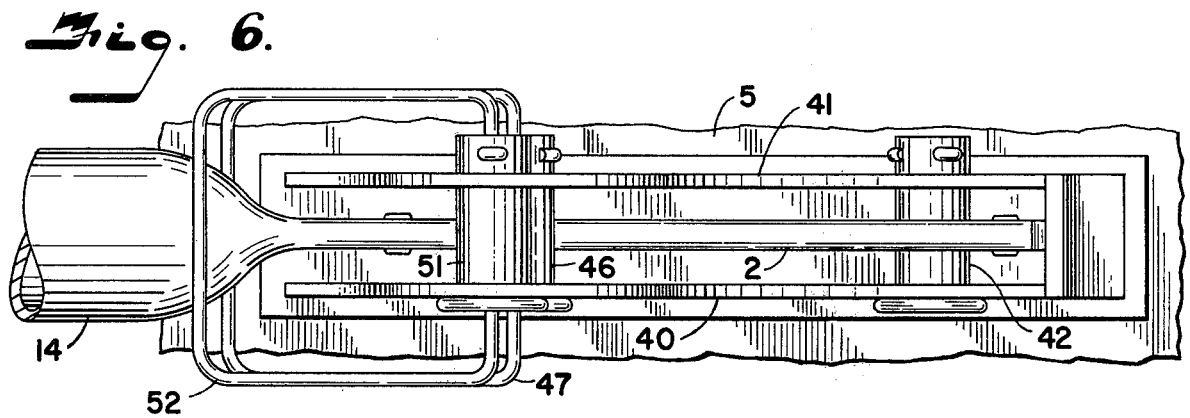
FIG. 6 is also a further enlarged top plan view showing the means for mounting the handle on the lawnmower.
Figure 5:
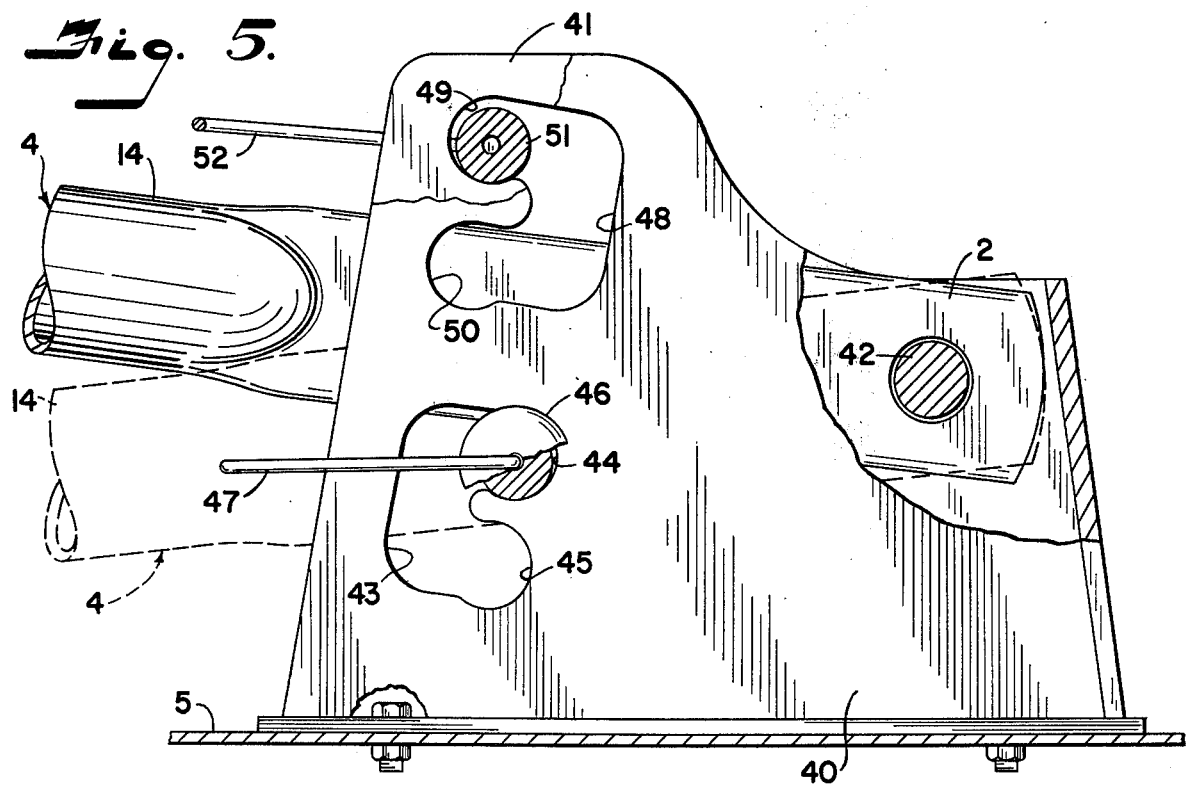
FIG. 5 is a further enlarged fragmentary side elevational view showing means for mounting the lawnmower handle on the lawnmower.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally an improved lawnmower handle particularly adapted for use when mowing steep slopes, terraces, and the like. The lawnmower handle 1 has spaced end portions 2 and 3 of a lower handle member 4 mounted on a lawnmower housing 5 and extending generally parallel with a direction of travel of the lawnmower and extending rearwardly from the connection thereof to the housing 5 for supporting thereon an upper handle member 6 extending upwardly and rearwardly from the lower handle member 4. An auxiliary handle member 7 has spaced end portions 8 and 9 mounted on the lower handle member 4 adjacent the spaced end portions 2 and 3 thereof and the auxiliary handle member 7 has a gripping portion 10 positioned rearwardly of and substantially level with a gripping portion 11 of the first named upper handle member 6. The lawnmower handle is releasably retained in a first position for use during mowing substantially level surfaces and gentle slopes and the lawnmower handle 1 is releasably retained in a second position for use during mowing a steep slope, terrace, or the like.

The lawnmower housing 5 may be any suitable structure adapted to enclose grass cutting blades (not shown) and having an upper surface adapted to support handle mounting means thereon. The lawnmower housing 5 has suitable wheels 12 thereon whereby a push or pull applied to the handle 1 effects movement of the lawnmower over a ground surface (not shown).

The lower handle member 4 has the spaced end portion 2 and 3 thereof adapted to be mounted on the housing 5 and extends generally rearwardly from the point of connection to the housing 5 whereby the end portions 2 and 3 are substantially parallel with a surface supporting the lawnmower housing 5. The lower handle member 4 is a generally U-shaped member having a pair of arms 14 and 15 extending rearwardly and upwardly from the end portions 2 and 3 respectively. The end portions 2 and 3 of the lower handle member 4 are illustrated as generally straight and flat or planar members adjustably mounted on the handle mounting means on the housing 5 and each having an aperture therethrough. The lower handle member 4 has a connecting portion 16 extending between upper end portions of the arms 14 and 15. The arms 14 and 15 are illustrated as rods which are generally circular in cross section.

The arms 14 and 15 are generally acute and extend between and are tangent to the generally straight end portions 2 and 3 and to generally straight upper end portions of the arms 14 and 15 which are positioned to form an angle in the range of 0° to 30° (0° to 30°) between the upper end portions of the arms 14 and 15 and a plane extending from the lower handle member end portions 2 and 3 and substantially parallel with a surface supporting the lawnmower. The upper end portions of the arms 14 and 15 are joined to the connecting portion 16 by bends 17 and 18 respectively.

The upper handle member 6 is also a generally U-shaped member having spaced end portions 19 and 20 suitably removably connected to the lower handle member 4, as by a plurality of fastening members 21 and 22 respectively, such as bolts extending through the end portions 19 and 20 of the upper handle member 6 and through the upper end portions of the arms 14 and 15 respectively of the lower handle member 4 with the bolts 21 and 22 being retained in position by suitable nuts and washers, such as wing nuts and lock washers.

The end portions 19 and 20 of the upper handle member 6 are each preferably generally semi-circular in cross section thereby being adapted to at least partially surround the upper end portions of the arms 14 and 15 respectively adjacent and below the bends 17 and 18.

The upper handle member 6 includes side members 23 and 24 extending from the end portions 19 and 20 respectively and the side members 23 and 24 are joined to the gripping portion 11 by bends 25 and 26 respectively.

The side members 23 and 24 are preferably coplanar with upper end portions of the arms 14 and 15 of the lower handle member 4 and thereby form an upper extension of the lower handle member 4.

It is desirable that the height of the gripping portion 11 of the upper handle member 6 above a ground surface (not shown) be adjustable to conform to the height of a person using the lawnmower handle 1. Therefore, the generally straight upper end portions of the arms 14 and 15 each have a plurality of spaced apertures therein each adapted to receive the fastening members 21 and 22 respectively. It may also be desirable to fold the lawnmower handle 1 for storage. Therefore, the fastening devices 21 and 22 may be loosened to permit the upper handle member 6 to pivot about same for movement toward and away from the lawnmower housing 5.

The auxiliary handle member 7 is also generally a U-shaped member having the spaced end portions 8 and 9 thereof connected to the lower handle member 4 adjacent the spaced end portions 2 and 3 thereof. The auxiliary member handle 7 includes side members 27 and 28 extending from the end portions 8 and 9 respectively thereof and joined to the gripping portion 10 by bends 29 and 30 respectively. The side members 27 and 28 are positioned inwardly of the side members 23 and 24 of the upper handle member 6 and inwardly of the arms 14 and 15 of the lower handle member 4. In the illustrated embodiment, an elongated rod 31 extends between and has opposite ends thereof mounted on the generally straight lower end portions 2 and 3 of the arms 14 and 15 of the lower handle member 4, as by welding. The end portions 8 and 9 of the auxiliary handle member 7 are illustrated as flat or planar members and have suitable apertures therein to permit the rod 31 to extend therethrough whereby the auxiliary handle member 7 is pivotally mounted on the lower handle member 4 adjacent the spaced end portions 2 and 3 thereof.

It is, therefore, desirable to maintain the auxliary handle member 7 in a selected position relative to the upper handle member 6. The auxiliary upper handle member 7 is preferably positioned below the upper handle member 6 and the upper end portions of the arms 14 and 15 of the lower handle member 4 and is maintained in a position to define an acute angle therebetween, such as in the nature of 5° to 30° (5° to 30°). Therefore, suitable hangers 32 and 33 are suitably connected to and depend from the side members 23 and 24 respectively and are positioned adjacent and spaced from the end portions 19 and 20 of the upper handle member 6. The hangers 32 and 33 each have a plurality of spaced apertures therein to receive a suitable retainer, such as an elongated retainer rod 34.

The auxiliary handle member 7 is normally retained with the side members 27 and 28 thereof in engagement with generally U-shaped lower ends 35 and 36 of the hangers 32 and 33 respectively. The retainer rod 34 is normally positioned above the side members 23 and 24 to retain same within the U-shaped lower end portions 35 and 36 of the hangers 32 and 33.

As best seen in FIG. 4, the gripping portion 10 of the auxiliary handle member 7 is substantially level and coplanar with the gripping portion 11 of the upper handle member 6 and positioned rearwardly thereof whereby the auxiliary handle member 7 extends rearwardly of the upper handle member 6. The auxiliary handle member 7 is substantially longer than the upper handle member 6 thereby improving control of the lawnmower when mowing on steep slopes and terraces. The user's hands (not shown) will, therefore, be at substantially the same distance above a ground surface when holding either the gripping portion 10 of the auxiliary handle member 7 or the gripping portion 11 of the upper handle member 6.

As best seen in FIG. 3, the auxiliary handle member 7 is substantially narrower than the lower handle member 4 and the upper handle member 6 whereby a user of the lawnmower handle 1 may hold either the gripping portion 11 of the upper handle member 6 or the gripping portion 10 of the auxiliary handle member 7.

The handle mounting means on the housing 5 may be integral therewith or any suitable ears or the like mounted thereon, said mounting means have the spaced end portions 2 and 3 of the lower handle member 4 suitably connected thereto in a manner to permit movement of the lower handle member 4 between at least a first position for use during mowing of substantially level surfaces and gentle slopes and a second position for use during mowing steep slopes and terraces.

In the embodiment of the invention illustrated, a first bracket 40 and a second bracket 41 is provided for each of the spaced end portions 2 and 3 of the lower handle member 4. The first and second brackets 40 and 41 are mounted on the housing 5 adjacent a respective side edge portion thereof. The first and second brackets 40 and 41 are positioned in laterally spaced relation with a respective one of the end portions 2 and 3 of the lower handle member 4 positioned therebetween.

A pin 42 extends through suitable apertures in the first and second brackets 40 and 41 and through the aperture in the respective end portion 2 or 3 of the lower handle member 4 whereby the lower handle member 4 is pivotally mounted on the lawnmower housing 5. Each pin 42 is suitably removably retained in position, as by a head on one end thereof and a suitable fastener on the other end, such as a cotter pin.

The first and second brackets 40 and 41 have laterally aligned apertures 43 therein and spaced from the pin 42 mounted thereon. Each of the apertures 43 has first and second or upper and lower pockets or recesses 44 and 45 therein with a passage therebetween. The pockets 44 and 45 each open upwardly and outwardly whereby a support member 46 is retained therein by gravity.

The support member 46 extends between the first and second brackets 40 and 41 and has respective end portions thereof positioned in the respective apertures 43 therein. The support member 46 is positioned below the respective end portion 2 and 3 of the lower handle member 4 and engageable thereby for supporting same in either the first position or the second position.

It is desirable to provide means to permit easily moving the support member 46 between the upper and lower pockets 44 and 45, therefore, a handle portion 47 extends between opposite ends of the support member 46 and around the rear ends of the brackets 40 and 41. The handle portion 47 is preferably resilient to permit removal thereof from the opposite ends of the support member 46.

Means are preferably provided to retain the end portions 2 and 3 between the respective first and second brackets 40 and 41. Therefore, second apertures 48 are formed in the first and second brackets and positioned above the first named apertures 43 therein. The second apertures 48 also each have upper and lower pockets 49 and 50 therein with a passage therebetween. The pockets 49 and 50 each open upwardly and outwardly whereby a retainer member 51 is retained therein by gravity.

The retainer member 51 is positioned above the respective end portion 2 or 3 of the lower handle member 4 and engageable thereby to prevent upward movement of the lower handle member 4 above the retainer member 51. The construction of the retainer member 51 is similar to the support member 46 and includes a removable handle portion 52 whereby the lower handle member 4 may be moved upwardly for storage.

The handle portions 47 and 52 permit selective manual movement of the support member 46 and the retainer member 51 from the upper pockets 44 and 49 to the lower pockets 45 and 50 respectively, such as for changing the lawnmower handle 1 from a position for use when mowing substantially level surfaces or gentle slopes to a position for use during mowing steep slopes, terraces, and the like.

The lawnmower handle 1 is particularly adapted for use when mowing steep slopes, terraces, and the like and may be used on any lawnmower housing 5. A first bracket 40 and a second bracket 41 for each of the end portions 2 and 3 of the lower handle member 4 are mounted on the housing 5. The spacing between the end portions 2 and 3 preferably conforms to the lateral dimension of the housing 5. The length of the connecting portion 16 of the lower handle member 4, gripping portion 11 of the upper handle member 6, and gripping portion 10 of the auxiliary handle member 7 is established during manufacture to conform to the positioning of the respective first and second brackets 40 and 41 on the housing 5.

It is to be understood that while I have illustrated and described certain forms of my invention it is not to be limited to the specific form or arrangement of parts herein described and shown.

What I claim and desire to secure by Letters Patent is:

1. A lawnmower and handle therefor comprising:
  a. a lawnmower having a housing with wheels mounted thereon to permit movement along a ground surface;
  b. a pair of handle mounting members on said lawnmower housing and each comprising:
    1. a first bracket and a second bracket positioned in spaced relation;
    2. means in said first bracket and said second bracket defining generally C-shaped apertures each having laterally aligned first and second vertically spaced pockets and a passage therebetween; and
    3. a support member extending between said first bracket and said second bracket and having respective end portions thereof positioned in said respective apertures, said support member being removably received in a selected one of said first and second pockets and selectively movable therebetween;
  c. a handle member having spaced end portions each positioned between said respective first and second bracket and pivotally mounted thereon, said handle member end portions each being above and engageable with said respective support member;
  d. means on each of said handle mounting members for retaining said respective handle member end portion therebetween and each comprising:
    1. means in said first bracket and said second bracket defining second generally C-shaped apertures each having laterally aligned first and second vertically spaced pockets and a passage therebetween; and
    2. a retainer member extending between said first bracket and said second bracket and having respective end portions thereof positioned in said respective apertures therein, said retainer member being removably received in a selected one of said first and second pockets and selectively movable therebetween, said retaining members each being above and engageable by said respective handle member end portion;
  e. an upper handle portion having spaced end portions connected to said handle member and extending upwardly therefrom, said upper handle portion having a gripping portion at an upper end thereof;
  f. an auxiliary handle member having spaced end portions pivotally mounted on said handle member adjacent the spaced end portions thereof and having a gripping portion positioned rearwardly of and substantially level with the gripping portion of said upper handle portion; and
  g. means mounted on said upper handle portion and engageable by said auxiliary handle member for adjustably retaining same in a selected positioned relative to said upper handle portion.

2. A lawnmower and handle therefor as set forth in claim 1 wherein:
 a. said first and second vertically spaced pockets in each of said first named apertures each open upwardly and outwardly whereby said respective support member is retained therein by gravity; and
 b. said first and second vertically spaced pockets in each of said second apertures each open upwardly and outwardly whereby said respective retainer member is retained therein by gravity.

3. A lawnmower and handle therefor as set forth in claim 1 wherein:
 a. said upper handle portion includes a pair of side arms;
 b. said auxiliary handle member includes a pair of side arms; and
 c. said means for adjustably retaining said auxiliary handle member in a selected position relative to said upper handle portion comprises:
  1. a pair of hangers each connected to and depending from a respective one of said upper handle portion side arms;
  2. a plurality of spaced apertures in each of said pair of hangers, said apertures being arranged in laterally aligned pairs; and
  3. an elongated retainer rod extending between said hangers and received in a selected pair of apertures and engageable by said auxiliary handle member side arms.

* * * * *